United States Patent Office 3,294,526
Patented Dec. 27, 1966

3,294,526
DIP BRAZING COMPOSITION
Ronald D. Koeplinger, Saginaw, Mich., assignor to The Dow Chemical Company, Midland, Mich., a corporation of Delaware
No Drawing. Filed June 3, 1964, Ser. No. 372,387
2 Claims. (Cl. 75—122)

This invention relates to dip brazing and more particularly relates to a new and novel, low melting, dip brazing mixture for use in joining brazable magnesium base alloys.

Conventionally in dip brazing operations, component parts of, for example, magnesium alloy fabrications or assemblies to be brazed, that is, to be joined by flowing a thin layer (capillary thickness) of a non-ferrous filler metal or alloy into the space between them, are held together while a strip, wire, or paste of a brazing mixture or composition containing a filler metal, a flux binder and a carrier, applied so as to conform to the joint to be brazed, is placed thereon. The entire assembly is then preheated from about 800 to about 900° F. and the so-heated unit immersed in a flux bath maintained at a temperature range of from about 1075° F. to about 1130° F. at which the filler alloy melts and flows into the joint, without melting the article to be brazed. After, for example, about a minute and a half the unit is removed from the flux bath and cooled at least to a temperature whereupon the filler material solidifies to join the parts into a rigid unit.

In conventional practice, magnesium-base materials, nominally comprising, for example, about 12 percent by weight aluminum, about 5 weight percent of zinc, and about 0.3 percent manganese, balance magnesium, are used as a filler material in brazing mixtures in the joining of brazable magnesium or aluminum base parts. In using these particular brazing (filler) alloys, the minimum brazing temperature is about 1080° F. This and other known filler alloys, therefore, are limited in use because their melting temperatures in many cases exceed those of the articles or parts desired to be brazed. Accordingly, temperature control is very critical. Moreover, some configurations cannot be brazed because the base metal to be joined does not have, for example, enough strength at the brazing temperature to hold its shape. Other undersirable characteristics may also be encountered in the article as brazed when using these conventional brazing filler alloys, such as, for example, detrimental corrosion and low resulting shear strength.

It is a principal object of the present invention, therefore, to provide a new and novel filler alloy composition and brazing mixture for use in joining brazeable magnesium base articles or parts together, which essentially overcomes the disadvantages aforesaid encountered in brazing mixtures containing conventional filler alloy materials.

These and other objects and advantages will become apparent from the detailed description presented hereinafter.

The novel brazing mixture of the present invention comprises (1) about 8 parts by volume of a novel filler alloy composition, preferably in pelleted form, consisting by weight essentially of about 37 to 49% cadmium and about 25.5 to 28.5% zinc, balance magnesium, together with (2) from about 0.75 to about 6.0 parts by volume of a particulated flux binder, and (3) sufficient liquid carrier to form the binder and filler into a paste or slurry consistency. The pellets of the filler metal used in the above brazing mixture as a maximum are about −60 to +325 mesh in size (U.S. Standard Sieve Series) and preferably about −80 to +200 mesh in size. Pellets greater in size than aforesaid cause the undesirable result of allowing the paste mixture to fall from the brazement in preheating. Use of finer pellets on the other hand causes resultant small and inadequate fillets to form.

The term "magnesium" as used herein means the pure metal, commercially available primary magnesium such as, for example, so-called cell magnesium, containing the normal impurities or in certain cases magnesium base alloys suitable for use in preparing the present novel filler alloy of the present invention. The terms "zinc" and "cadmium" as used herein mean the pure metal, commercially available primary zinc and cadmium metal containing the normal impurities or zinc and cadmium base alloys suitable for use as the zinc or cadmium component of the present novel filler alloy of the present invention.

The filler alloy compositions used in the above brazing mixtures, as specified, flow, for example, at about 950° F. to about 1000° F., well below the melting point of most of the more commercially important magnesium and aluminum base alloys.

The flux (high temperature) binders mentioned for use in the present brazing mixtures of the invention melt or are at least semi-molten at temperatures of from about 727° F. to about 892° F. and thus are suitable for the preheating operation in dip brazing methods. Such a flux which may be used and which is preferable is a flux binder having by weight the nominal composition: 55 percent KCl, 34 percent $MgCl_2$, 9 percent $BaCl_2$, and 2 percent $CaF_2$, hereinafter designated as No. 470 binder. Other flux binder compositions such as, for example, those set forth in Table I below may also be used and have been found to promote the formation of good fillets and acceptable metal flow.

TABLE I

| Nominal Composition by Weight, Percent | | | | | Melting Point, °F. |
|---|---|---|---|---|---|
| KCl | $MgCl_2$ | $BaCl_2$ | $CaF_2$ | NaCl | |
| 62 | 38 | | | | 810-815 |
| 18 | 58 | 24 | | | 865-892 |
| 17 | 54 | 7 | | 22 | 727-774 |
| 53 | 34 | 12 | 1 | | 788-804 |
| 56 | 37 | 6 | 1 | | 792-806 |

Preferably, the particulated binding material will be as a maximum about 20 mesh in size (U.S. Standard Sieve Series) as brazing mixtures prepared from coarser particles of binder do not readily adhere to the brazement while preheating the parts to be joined. Preferably, the flux binder particles should be from 60 to 230 mesh in size or smaller.

The liquid carrier for combining the flux binder and filler alloy into a paste consistency can be any material which (a) is liquid at room temperature (b) is substantially chemically inert to the mix components, (c) does not promote reaction between the binder and filler (d) has a boiling point below about 500° C., (e) will undergo little or no carbonization in the preheat furnace and which (f) does not volatilize rapidly at room temperature. In practice, the carrier acts as a low or room temperature binder material.

Carrier liquids suitable for use in the present invention are preferably organic and are selected from the group which includes aromatic hydrocarbons, e.g., benzene; alkyl-aryl hydrocarbons, e.g., toluene and xylene; chlorinated aliphatic and aromatic hydrocarbons, e.g., carbon tetrachloride, perchlorethane, chlorobenzene; aliphatic hydrocarbons, e.g., decane, octane, mineral spirits, kerosene, symmetrical and mixed ethers, ketones and other oxygen containing organics; carbon disulfide, and the like. Mineral spirits, however, is a very desirable carrier as it has a low volatilization rate at room temperature and does not excessively carbonize.

The amount of liquid carrier to be used is not critical but will be an amount to provide a slurry or preferably a paste when admixed with the binder and pellets. Ordinarily, the brazing composition as prepared will contain from about 20 to about 35 percent by weight of the carrier, based on the combined weights of the binder and pellets. Preferably, the carrier will be about 25 percent of the binder and pellet composition weight. For thin consistencies, the larger amounts of carrier will be used while for thicker pastes smaller amounts of the carrier will be incorporated into the brazing mixture, as is understood by those skilled in the art.

The brazing mixture of the present invention, is used primarily for dip brazing of most magnesium base alloys, which include, for example, AZ10A, AZ31B, ZE10A, and M1A (A.S.T.M. designated nomenclature).

In general, the dip brazing process using the novel low melting brazing mixture of the present invention comprises: (1) cleaning and degreasing the magnesium base alloy parts to be joined by brazing, (2) assembling the clean parts so as to provide a capillary like spaced joint between said parts, e.g., about 0.01 to 0.032 of an inch, (3) applying the present novel brazing mixture to the joint so-formed, (4) preheating the assembly to a temperature of from about 825° F. to about 850° F., (5) immersing the preheated assembly in a molten flux bath having a temperature of from about 900° F. to about 1000° F. and, (6) removing the assembly, allowing it to cool at least sufficiently to solidify the filler alloy of the brazing mixture, whereupon, if necessary, the so-brazed article may be cleaned.

Any of the conventional cleaning compositions or methods suitable may be used to clean the parts prior to brazing. Similarly, conventional jigs, fixtures or other holding means may be used to secure the parts during brazing. The assembly ready for brazing is preheated, for example, by means of a gas-fired or electrically heated furnace. Immersion time in the flux bath may vary, for example, from about 30 seconds to about 3 minutes, depending on the mass of the parts to be brazed. Post-braze cleaning is carried out using methods for cleaning and chemically treating the brazed assembly as known to one skilled in the art.

With respect to the amount of brazing mixture to be used, only enough is employed to provide a uniform resulting fillet. Large excesses of mix are desirably avoided. The mix as a paste may be applied conventionally, for example, by brush, or spatula, or possibly by extrusion from a tube and the like.

Although the filler alloy of the present invention has been described for use primarily and preferably as pellets in a paste-like brazing mixture, it should be understood that the filler alloy may also be employed alone, that is, without the flux binder and carrier liquid, in dip brazing. Exemplary configurations to be employed include rod, shim stock, metal spray and the like. In such a case the alloy ordinarily would be applied to the joint to be brazed and the joint then immersed in the flux path to perfect the joining operation.

The following examples will serve to further illustrate the present invention, but are not meant to limit it thereto.

*Example 1.*—Pellets of $+80$ to $-325$ mesh of the instant novel filler alloy (nominal composition 39% Cd, 28% Zn, balance of cell magnesium) were mixed with $-100$ to $+200$ mesh No. 470 flux binder and sufficient mineral spirits (U.S.P. grade) to make a thick paste, to prepare a number of brazing mixtures in accordance with the invention over the range of about 8 parts by volume pellets to form about ¾ to about 6 parts by volume flux.

An inverted T-shaped assembly was fabricated for joining purposes by tack welding the end corners of a 2″ long ½″ wide by ⅛″ thick piece of ZE10A magnesium base alloy (as the vertical leg of the T) centrally along the transverse axis of a 2″ square, ⅛″ thick ZE10A plate such to provide a clearance of about 0.01 inch betwetn the plate and vertical leg. All surfaces to be brazed (i.e., either or both sides of the vertical leg at the 0.01 inch spaced joint) were sanded with No. 320 grit Aloxite (abrasive) cloth and further abraded with steel wool. A layer of the present brazing paste mixture prepared as above was brushed onto the joints at the junction of the vertical leg with the plate.

In a vertical position so as to maintain the flux in position till it became molten, the assembly was preheated in an electric pot furnace to about 825° F. until the flux binder in the mixture became molten (the mineral spirits having evaporated or burned off). The assembly then was removed from the pot and immersed in a molten bath of No. 452 flux (nominal composition being 42.5% KCl, 10% NaCl, 37% LiCl, 10% NaF and 0.5% $AlF_3 \cdot 3NaF$) for about 1½ minutes maintained at a temperature of about 950° F. Upon removal of the T samples from the bath they were allowed to cool to about 600° F., quenched in cold water, and then immersed in boiling water for several minutes to remove adhering flux residues, and examined as to the quality of fillets resulting and were found to be satisfactory in all cases. These results are presented in Table II which follows:

TABLE II

| Run No. | Pellet-to-Flux Binder Ratio | Results | |
|---|---|---|---|
| | | T Sample | Horizontal Flow |
| 1 | 8-¾ | Small Fillets, but acceptable. | Good Fillets. |
| 2 | 8-1½ | Good Fillets | Do. |
| 3 | 8-2¼ | do | Do. |
| 4 | 8-3 | do | Do. |
| 5 | 8-3¾ | do | Do. |
| 6 | 8-4½ | do | Slightly small but acceptable. |
| 7 | 8-5¼ | do | Good Fillets. |
| 8 | 8-6 | do | Small Fillets, but acceptable. |

*Example 2.*—Similarly as in Example 1 the same paste composition and pellet-to-binder ratios were applied to test specimens also of ZE10A comprising a 2″ square plate having centrally located thereon a partially curved vertical leg ½″ high and ⅛″ thick also spaced 0.01 inch from the plate. Only the concavical juncture of the leg and plate, however, was provided with the brazing mixture. The purpose of this test was to determine the horizontal flow characteristics of the mixture (i.e., flow to the convexical side). The specimens so-treated were also examined for fillet quality and found to be satisfactory in all cases. The results are also presented in the foregoing Table II.

*Example 3.*—A brazing paste mixture was prepared using −200 mesh No. 470 flux binder, Mg—28%, Zn 39%, cadmium pellets as a filler, and mineral spirits as a carrier. The volume ratio of pellets to binder in the paste was 8 to 3. A number of horizontal flow specimens such as in Example 2 were prepared and brazed following generally the procedure as set forth in Example 1. The pellet size distribution in the paste was varied from run to run. The results of these tests are presented in Table III below.

TABLE III

| Run No. | Pellet Size (U.S. Standard Sieve) Mesh | Brazing Results |
| --- | --- | --- |
| 1 | [1] +80 | Makes coarse paste. |
| 2 | −80+200 | Good paste—good fillets. |
|  | −100+140 | Do. |
|  | −140+170 | Do. |
| 3 | −170+200 | Do. |
|  | −200+230 | A little small but acceptable. |
| 4 | −230+270 | Do. |
| 5 | −270+325 | Do. |
| 6 | −325 | Very small. |

[1] Particles not passing through.

Similar to the foregoing novel brazing paste mixtures may be prepared in varying ratios by parts by volume of the novel pelleted filler alloys of varying mesh size comprised of zinc, cadmium and Mg, within the ranges hereinbefore specified, with other flux binders and carriers in order to produce brazing mixture in accordance with the present invention for use in dip brazing, which will also form high quality fillets.

It is manifest that the present invention may be changed or modified without departing from the spirit or scope thereof, and it is understood that I limit myself only as defined in the appended claims.

I claim:
1. A low melting filler alloy for use in brazing consisting essentially by weight from about 37.0 to about 49.0 percent cadmium and from about 25.5 to about 28.5 percent zinc, the balance being magnesium.
2. A low melting filler alloy for use in brazing consisting essentially by weight, about 28 percent zinc and 39 percent cadmium, the balance being magnesium.

References Cited by the Examiner
UNITED STATES PATENTS
3,108,369   10/1963   Koeplinger _____ 29—504 X DAVID L. RECK, *Primary Examiner.*
H. F. SAITO, *Assistant Examiner.*